United States Patent [19]

Peterson

[11] Patent Number: 4,875,816
[45] Date of Patent: Oct. 24, 1989

[54] CAGED FASTENER

[75] Inventor: Francis C. Peterson, Woodbury, Conn.

[73] Assignee: Buell Industries, Inc., Waterbury, Conn.

[21] Appl. No.: 264,612

[22] Filed: Oct. 31, 1988

[51] Int. Cl.⁴ .................... F16B 27/00; F16B 37/00
[52] U.S. Cl. ..................................... 411/104; 411/85; 411/112; 411/970
[58] Field of Search ............... 411/104, 105, 103, 112, 411/84, 85, 174, 175, 182, 523, 966, 970, 999

[56] References Cited

U.S. PATENT DOCUMENTS

| | | |
|---|---|---|
| 2,251,643 | 8/1941 | Tinnerman ........................ 411/970 |
| 2,552,499 | 5/1951 | Tinnerman ........................ 411/970 |
| 2,649,883 | 8/1953 | Sharp . | 
| 2,661,821 | 12/1953 | Tinnerman ....................... 411/970 |
| 3,025,897 | 3/1962 | Gielegheim . | 
| 3,091,272 | 5/1963 | Patten .............................. 411/112 |
| 3,695,324 | 10/1972 | Gulistan . | 
| 3,738,406 | 6/1973 | Williams ........................... 411/112 |
| 4,193,435 | 3/1980 | Charles et al. . | 
| 4,270,591 | 6/1981 | Gill et al. ......................... 411/103 |

Primary Examiner—Neill R. Wilson
Attorney, Agent, or Firm—St. Onge Steward Johnston & Reens

[57] ABSTRACT

A caged fastener adapted to be mounted in a hollow frame member without welding comprises a fastener body having a threaded bore therein and a cage enclosing the fastener body and providing it a limited range of movement in at least one direction and providing access to the threaded bore. Holding members comprising rigid and spring members extend from the cage and frictionally fit inside the hollow frame member. The spring resilience of the spring member allows the caged fastener to be snapped in place and retained in the frame member.

9 Claims, 2 Drawing Sheets

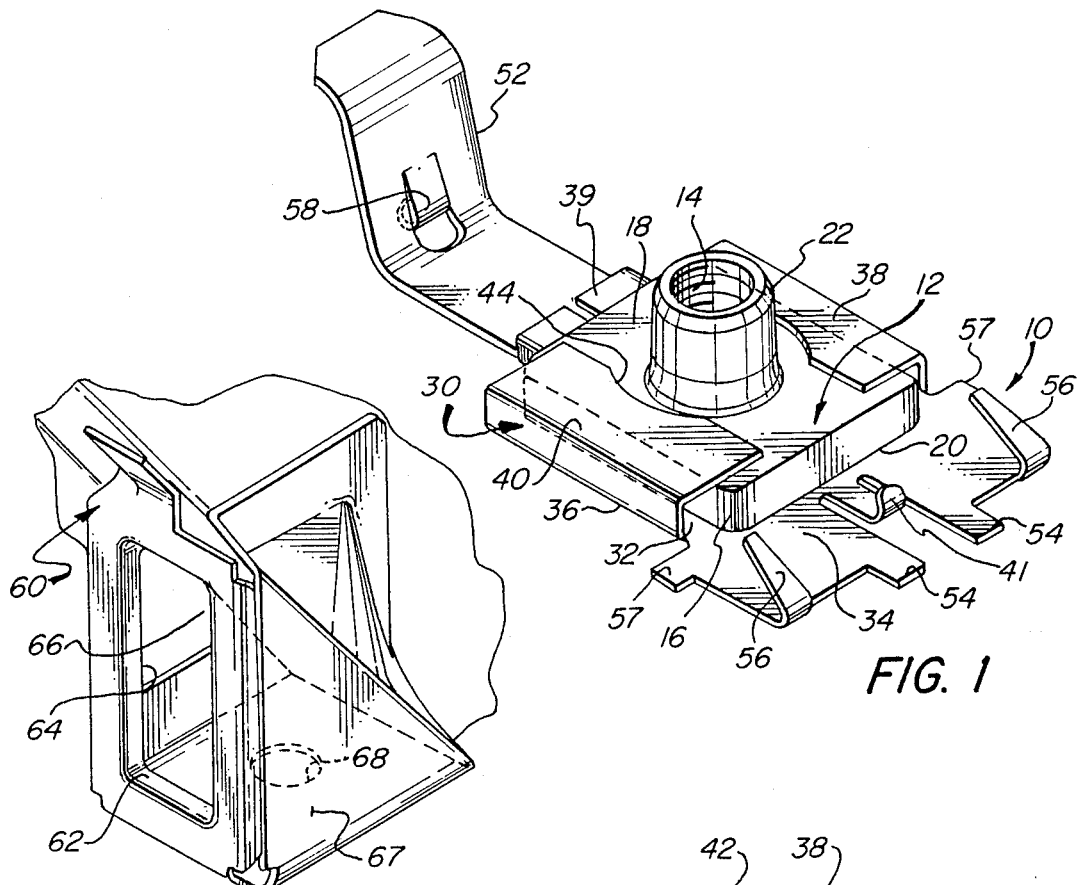
FIG. 1
FIG. 3
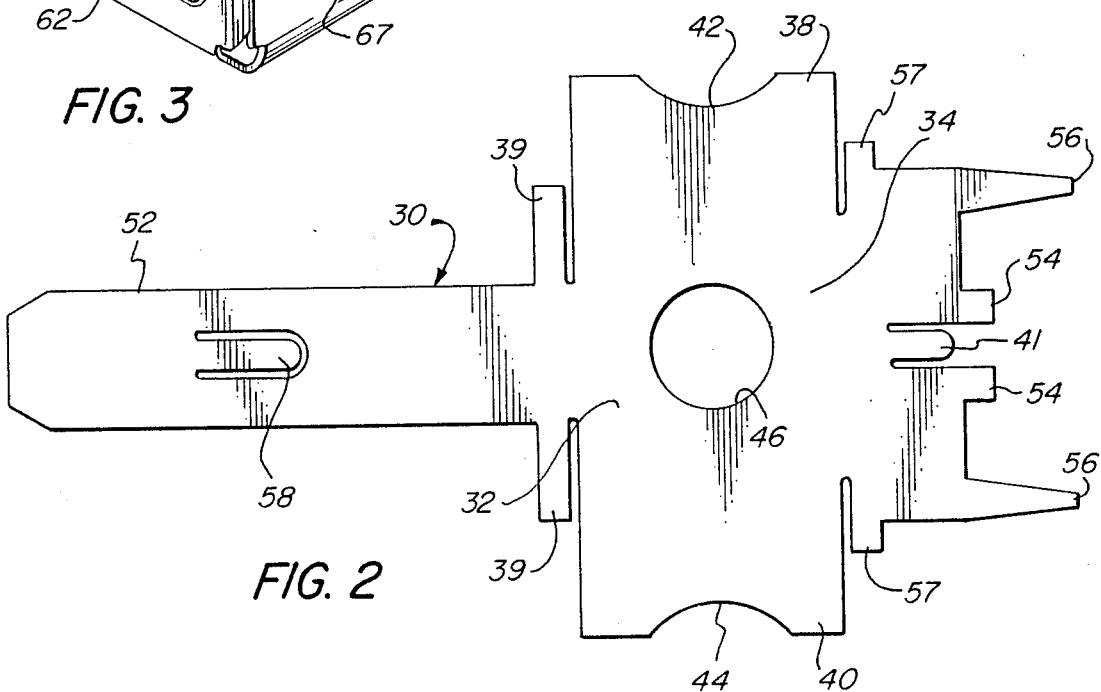
FIG. 2

CAGED FASTENER

FIELD OF THE INVENTION

The present invention relates to caged fasteners adapted to be mounted in hollow frame members.

BACKGROUND OF THE INVENTION

Caged fasteners such as caged nuts are frequently used in the manufacture of automobiles and other goods. A caged nut generally comprises a nut encaged in a structure that allows access to the nut bore, and provides the nut with a limited range of movement within the cage. In the manufacture of automobiles using caged nuts, the cage is welded onto the frame of the automobile and provides a nut at a selected location for the attachment of another part, such as a door, to the frame. The range of movement of the nut in the cage is provided so that the part being mounted on the frame may be adjusted relative to the frame during final assembly.

A caged nut provides advantages in that it can be assembled into a product framework during manufacture, so that the number of operations required in the final assembly of the product are reduced. In addition, a caged nut can be attached to the framework in locations which subsequently become enclosed or tightly circumscribed as more parts are assembled onto the product. If a caged nut was not provided in such situations, it would be very difficult to locate a nut by hand to receive a bolt used to fasten components such as a door onto a vehicle frame. In the usual practice in the automotive industry, the caged nut is spot welded on the frame prior to the application of rust inhibiting coatings and paint.

It has been found that welding the caged nut onto the frame can promote corrosion of the frame, since the rust inhibiting coatings may not penetrate into the space between the cage and the frame, thereby leaving bare metal parts which are suceptible to corrosion. Also, since the caged nut is attached to the frame before painting, the threading of the caged nut very often becomes clogged with paint during the painting operation, making it difficult to thread a bolt into the caged nut. Various methods proposed to solve this latter problem have included applying coatings of polytetrafluoroethylene (Teflon) to the threading in the cage nut, and inserting sleeves into the nut to protect the threads during the painting operation. However, these methods are both time-consuming and expensive.

SUMMARY OF THE INVENTION

It is an object of the present invention to provide a caged fastener which can be mounted in a frame member without welding. It is a further object of the present invention to provide a caged fastener which can mounted into a frame member after a coating has been applied to the frame. It is a further object of the invention to provide a caged fastener which can be precisely and accurately mounted in a vehicle frame member even where it is to be mounted in an enclosed space. It is a further object of the invention to provide a caged fastener which does not promote corrosion on a frame when mounted thereon.

A caged fastener in accordance with the invention preferably comprises a fastener body having connecting means therein; cage means for encaging the fastener body, the cage means providing a limited range of movement of the fastener body in at least one direction, and having apertures sized and adapted to allow access to the bore within the range of movement of the fastener body; and holding members extending from the cage means, the holding members being sized and adapted to frictionally fit against surfaces for mounting the caged fastener. The connecting means may comprise a female fastener such as a bore adapted to receive a rivet, male threaded fastener or other connector, or it may be a male fastener such as a threaded stud. The holding members preferably comprise at least one spring member and at least one rigid member extending from opposite sides of the cage means. A hook sized and adapted to engage a lip of an aperture in the hollow frame member may be provided on the spring member. A secondary spring member extending from the cage means may be provided adjacent the rigid member. A lateral strut extending from the cage means perpendicularly to the spring member and the rigid member may also be provided.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 1 is a perspective view of an embodiment of a caged fastener of the present invention.

FIG. 2 is a top plan view of the cage of the caged fastener of FIG. 1 as a flat part prior to bending of the extending members.

FIG. 3 is a perspective view of a hollow frame member for which the embodiment of the caged fastener of FIG. 1 is adapted.

DESCRIPTION OF THE PREFERRED EMBODIMENT

Figure 4:
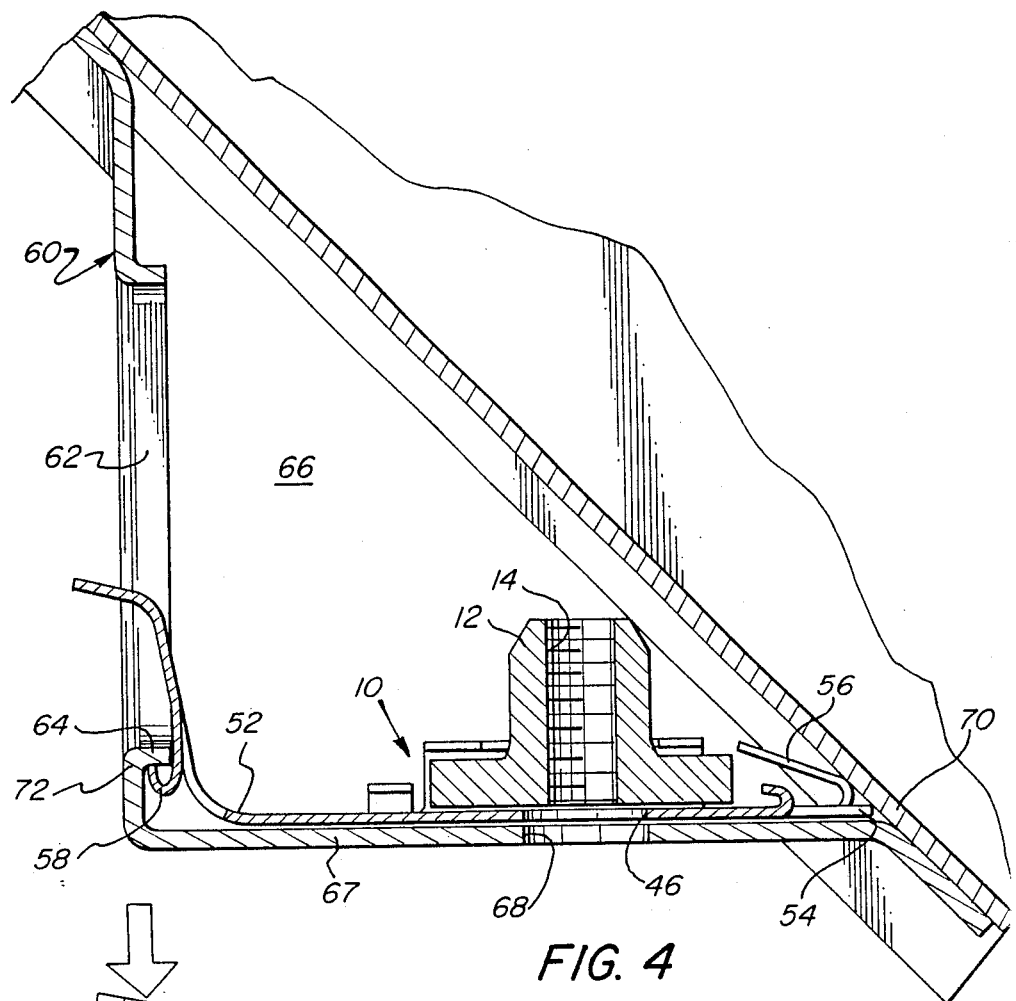
FIG. 4 is a cross-sectional view of the caged fastener of FIG. 1 mounted in the hollow frame member of FIG. 3.

With reference to FIG. 1, a caged fastener adapted to be mounted in a hollow frame member is shown generally at 10. Caged fastener 10 comprises a fastener body 12 having connecting means therein. The connecting means may comprise a female fastening means such as a connecting bore adapted to receive a male fastener, such as a rivet, male threaded fastener, or a male snap-in connector, or it may comprise a male fastening means such as a threaded stud or bolt, or a snap mount connector. In the preferred embodiment, the connecting means comprises a bore 14 which is internally threaded to receive a male threaded fastener. Body 12 preferably comprises a generally planar base 16 having generally planar upper and lower surfaces 18 and 20 and a cylindrical stem 22 extending therefrom. Threaded bore 14 preferably extends through the cylindrical stem 22.

Cage means for encaging the body is provided around the body 12. The cage means, shown as cage 30 in FIG. 1 in an assembled condition and in FIG. 2 as a flat part prior to bending of the various extending members, comprises a generally planar base 32 having generally planar upper and lower surfaces 34 and 36 respectively and two leaf elements 38 and 40 extending from at least a portion of the base 32. The leaf elements 38 and 40 are bent to enclose the base 16 of the body 12. The leaf elements 38 and 40 overly at least a portion of the upper surface 18 of the base 16 of the fastener body 12 so that the planar and vertical motion of the body 12 is generally restricted within the cage by the the overlying leaf elements 38 and 40. Stops 39 and 41 formed by bending two of the extending members further limit the motion of the body 12 within the cage. The leaf elements 38 and 40 have generally semicircular cutouts 42 and 44 at their ends which surround the stem 22 at a radial distance therefrom.

Cage 30 is sized so that the body 12 has a limited range of movement in at least one planar direction, and preferably in two planar directions. The range of planar movement in the embodiment of the invention shown in the Figures is determined by the leaf elements 38 and 40 which surround the stem 22 and by the stops 39 and 41.

An aperture 46 is provided in the cage 30 to allow access through the base 32 of the cage 30 to the bore 14 of body 12 within the range of movement of the body 12. At least a portion of the upper surface 34 of the base 32 of the cage is adjacent to the lower surface 20 of the base 16 of the caged fastener 10.

Holding members extend from and are preferably integrally formed with the cage means. The holding members preferably comprise at least one spring member 52. Spring member 52 extends from one end of the cage 30 and preferably comprises a spring metal member bent to frictionally engage a mounting surface. At least one rigid member 54 is preferably provided. Rigid member 54 extends from another, preferably opposite, end of the cage 30 and preferably comprises an unbent member. At least one secondary spring member 56 which extends from the cage 30 adjacent the rigid member 54 is preferably provided. At least one lateral strut 57 which extends from the cage 30 perpendicularly to the spring member 52 and the rigid member 54 is preferably provided. Most preferably there are two said secondary spring members 56 and two said lateral struts 57.

Each of the rigid member, lateral strut, spring member, and secondary spring member need not necessarily extend from the cage, and may be a part of the cage or may be formed in various ways as, for example, they may comprise detents extending from the cage. Similarly, the holding members may all be formed of a resilient material which adapt to hold the caged fastener in place, for example, they may be blocks of resilient foam rubber or the like.

A hook 58 may be provided, preferably on the spring member, to engage a lip around an aperture in a hollow frame member.

A hollow typical hollow frame member for which the caged fastener 10 of the present invention is adapted is shown as 60 in FIG. 3. An aperture 62 having a lip 64 provides access to a nut chamber 66 and is sized to permit the caged fastener 10 to pass through it. The various holding members, namely the spring member 52, rigid member 54, secondary spring members 56 and lateral struts 57 are sized to fit inside the perimeters of the wall 67 of nut chamber 66. A bolt hole 68 is located in a wall of the nut chamber 66 facing in the direction on which a door or other assembly will be mounted. It is to be appreciated that the hollow frame member 60 shown and described is only exemplary of the kinds of structures in which the caged fastener of the present invention may be mounted, and such structures may include all other shapes which provide surfaces for a frictional fit of the holding members to mount the caged fastener, and may, for example, include channels, spaced apart members, or any other appropriately sized and adapted structure.

Figure 5:
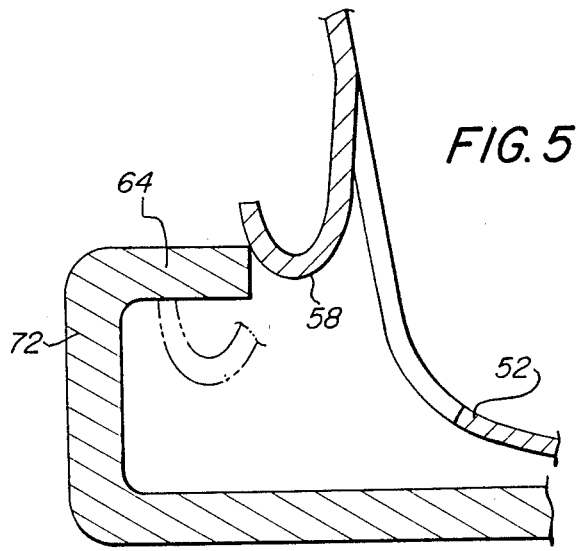
FIG. 5 is a detailed cross-sectional view of the engagement of the hook of the caged fastener of FIG. 1 with a lip of the hollow frame member.

The use of the caged fastener 10 in the hollow frame member 60 is shown in FIGS. 4 and 5. The caged fastener 10 is inserted into the nut chamber 66 through aperture 62. In the particular embodiment of the hollow frame member 60 shown in the Figures, it is necessary to hold the caged fastener 10 in a position that is perpendicular to its ultimate position shown in FIG. 4 when inserting it through the aperture 62. Once the body 12 is inserted into the nut chamber 66, the caged fastener 10 may be rotated to place it in position for mounting in the hollow frame member 60.

The caged fastener 10 is fitted into the hollow frame member 60. The rigid member 54 and the secondary spring members 56 abut the wall 70 of the nut chamber 66 and prevent movement of the caged fastener 10 in the direction of the wall 70. The spring member 52 is then snapped into place against the opposite wall 72 of nut chamber 66 by force applied to handle 53, to hold the caged fastener in place in nut chamber 66. The spring resilience of the spring member 52 allows the caged fastener 10 to be snapped in place and retained in the frame member 60. In the preferred embodiment the hook 58 lockingly engages the lip 64 of aperture 62, as shown in FIG. 5.

The caged fastener of the present invention may be mounted in a frame member after the frame has been full assembled and after anti-corrosion coatings and paint have been applied. By mounting the caged fastener to the frame after painting, the present invention reduces the problems of corrosion on the vehicle frame by minimizing the amount of untreated frame. In addition, the present invention completely eliminates the problems of paint clogging of the fastener threads associated with the prior art designs in which a caged nut was welded to the frame before painting of the body by allowing the fastener to be mounted on the frame after painting.

Preferably the body 12 is formed of steel, and may be cast or cold formed by methods known in the art. Preferably the cage 30 is formed of spring steel, and may be a stamped from sheet metal.

It is to be appreciated that the disclosure and drawings are not limiting, as the particular shape of the body 12 and the cage 30 may be varied to meet the particular size or shape of an available nut chamber in which it is to be mounted, based on the principle of a snap mounted caged fastener which is held in place by a frictional fit which is effected by a spring member which engages the nut chamber wall. The orientation and the arrangement of the various elements, particularly the holding members, may be adapted to particular needs all in accordance with the invention.

Thus the present invention provides a new and useful caged fastener for mounting in a frame, which reduces problems of corrosion and paint clogging associated with the prior art caged nut.

I claim:

1. A caged fastener, comprising:
a fastener body having connecting means therein;
cage means for encaging said fastener body, said cage means providing a limited range of movement of said fastener body in at least one direction, and having apertures sized and adapted to allow access to said bore within the range of movement of said fastener body; and holding members extending from said cage means, said holding members being sized and adapted to frictionally fit against surfaces for mounting said caged fastener, said holding members comprising at least one spring member which extends from at least one end of said cage means, and at least one lateral strut extending from said cage means generally perpendicularly to said spring member.

2. A caged fastener in accordance with claim 1, further comprising at least one rigid member, and wherein said rigid member extends from one end of said cage means, and said spring member extends from another end of said cage means.

3. A caged fastener in accordance with claim 2, wherein said spring member further comprises a hook sized and adapted to engage a lip of an aperture in said hollow frame member.

4. A caged fastener in accordance with claim 2, further comprising at least one secondary spring member extending from said cage means adjacent said rigid member.

5. A caged fastener in accordance with claim 2 wherein said connecting means comprises a threaded bore.

6. A caged fastener adapted to be mounted in a hollow frame member, comprising: a fastener body having connecting means therein; a cage having a generally planar base and two leaf elements extending therefrom and bent to enclose said fastener body, said leaf elements being formed at their ends to surround said fastener body at a distance sufficient to allow said fastener body a limited range of movement in at least one direction, said base having an aperture therein sized and located to allow access to said bore within the range of movement of said fastener body; and holding members extending from said cage, said holding members being sized and adapted to frictionally fit inside said hollow frame member, said holding members comprising at least one spring member which extends from one end of said cage means, at least one rigid member which extends from another end of said cage means, and at least one lateral strut extending from said cage means generally perpendicularly to said spring member and said rigid member.

7. A caged fastener adapted to be mounted in a hollow frame member in accordance with claim 6, wherein said spring member further comprises a hook sized and adapted to engage a lip of an aperture in said hollow frame member.

8. A caged fastener adapted to be mounted in a hollow frame member in accordance with claim 6, further comprising at least one secondary spring member extending from said cage adjacent said rigid member.

9. A caged fastener comprising:

a fastener body comprised of a generally planar base having generally planar upper and lower surfaces, a stem extending from the upper surface of said base, and a threaded bore extending through said base and into said stem;

a cage for generally confining the movement of said fastener body in all directions while permitting a limited range of movement of said fastener body in at least one planar direction, said cage comprising a generally planar base having generally planar upper and lower surfaces, said base of said cage having an aperture therein sized and located to permit access, through the base of said cage, to the bore of said fastener body within the range of planar movement of said fastener body within said cage, at least a portion of the upper surface of the base of said cage containing said aperture being adjacent the lower surface of the base of said fastener body, said cage further comprising leaf elements extending from at least the base portion of the cage which is adjacent the lower surface of the base of said fastener body, at least a portion of said leaf elements overlying at least a portion of the upper surface of the base of said fastener body such that planar and vertical motion of said fastener body is generally restricted within said cage by the overlying portions of said leaf elements while a limited range of movement of said fastener body in at least one planar direction within said cage is permitted; and holding members extending from said cage, said holding members being sized and adapted to frictionally fit inside said hollow frame member, said holding members comprising at least one spring member and at least one rigid member extending from opposite ends of said cage, secondary spring members extending from said cage adjacent said rigid member, and lateral struts extending from said cage perpendicularly to said spring member and said rigid member.

* * * * *